| United States Patent [19] | [11] Patent Number: 4,968,469 |
|---|---|
| White | [45] Date of Patent: Nov. 6, 1990 |

[54] PROCESS FOR MOLDING A THERMOPLASTIC MATERIAL CONTAINING A MELT-RELEASE MATERIAL

[75] Inventor: Steven A. C. White, Ivinghos, England

[73] Assignee: W. R. Grace & Co.-Conn., Lexington, Mass.

[21] Appl. No.: 484,456

[22] Filed: Feb. 16, 1990

Related U.S. Application Data

[63] Continuation of Ser. No. 316,890, Feb. 28, 1989, abandoned.

[30] Foreign Application Priority Data

Mar. 4, 1988 [GB] United Kingdom ............... 8805243

[51] Int. Cl.$^5$ ...................... B29C 43/16; B29C 47/00
[52] U.S. Cl. ................................... 264/148; 264/211; 264/268; 264/294; 264/300; 524/232; 524/262; 524/265; 524/557; 524/560; 524/563; 524/571; 524/574; 524/575; 524/577; 524/583; 524/585; 525/106; 525/199; 525/227; 525/235; 525/236; 525/479
[58] Field of Search ............... 264/130, 141, 142, 148, 264/210.6, 211, 264, 268, 294, 300, 338; 427/133, 135; 524/232, 262, 265, 557, 560, 563, 570, 571, 574, 575, 577, 581, 583, 585; 525/102, 103, 104, 105, 106, 199, 227, 232, 235, 236, 474, 479

[56] References Cited

U.S. PATENT DOCUMENTS

| | | | |
|---|---|---|---|
| 2,558,584 | 6/1951 | Safford | 264/300 X |
| 2,888,419 | 5/1959 | Safford | 525/106 X |
| 3,328,482 | 6/1967 | Northrup et al. | 525/102 X |
| 3,600,309 | 8/1971 | Loser et al. | 264/211 X |
| 3,705,122 | 12/1972 | Gwinner | 524/313 |
| 3,940,455 | 2/1976 | Kaufman | 525/199 X |
| 4,277,431 | 7/1981 | Peller | 264/148 |
| 4,518,336 | 5/1985 | Alieri | 425/110 |
| 4,535,113 | 8/1985 | Foster et al. | 524/262 |
| 4,622,193 | 11/1986 | Kresge et al. | 264/141 |
| 4,623,589 | 11/1986 | Simmonds, Jr. | 428/403 |
| 4,740,341 | 4/1988 | Chu | 264/211 |

FOREIGN PATENT DOCUMENTS

| 26405 | 4/1981 | European Pat. Off. |
|---|---|---|
| 73334 | 3/1983 | European Pat. Off. |
| 207385 | 1/1987 | European Pat. Off. |

*Primary Examiner*—Jeffery Thurlow
*Assistant Examiner*—Leo B. Tentoni
*Attorney, Agent, or Firm*—J. Dana Hubbard; William L. Baker

[57] ABSTRACT

Molded articles such as gaskets for container caps are made from a thermoplastic composition at high speed, for instance above 100 per minute, by continuously cutting a continuous supply of molten thermoplastic composition into molten pieces and transferring the molten pieces to a molding position at which they are molded into the gaskets or other desired articles, and the composition includes a melt-release material that continuously replenishes a melt-release layer on the surfaces by which the molten composition is cut and transferred to the molding position.

11 Claims, No Drawings

PROCESS FOR MOLDING A THERMOPLASTIC MATERIAL CONTAINING A MELT-RELEASE MATERIAL

This is a continuation of co-pending application Ser. No. 316,890 filed on Feb. 28, 1989 now abandoned.

BACKGROUND OF THE INVENTION

This invention relates to processes in which a thermoplastic polymeric composition is provided as a melt and a succession of articles are molded from the melt. The invention also relates to compositions particularly suitable for use in this process.

DESCRIPTION OF THE PRIOR ART

These processes are well known and can be operated continuously and at high speed. Thus a continuous supply of thermoplastic composition in molten form is provided and is continuously cut into molten pieces that are then transferred to a molding position by cutting and transfer means, and the transferred molten pieces are then molded into the desired molded articles at the molding position. For instance each piece may be transferred to a container cap where it is molded into a gasket within the cap.

Unfortunately molten thermoplastic polymeric compositions tend to be very sticky and so there is a tendency for the melt to stick to any surfaces it contacts. For instance the cutting is often conducted at an extrusion orifice, as the melt is extruded continuously from the orifice, and there is then a tendency for the melt to stick to the walls around the orifice. This can make long term, high speed, production difficult.

The cutting and transfer can be effected by using a flexible cutting blade that wipes across the orifice and projects the molten piece into the desired position. However for this to be successful it is necessary that the direction of travel of the projected piece should be very accurately predetermined, and contamination of the cutting device and/or the walls around the orifice are liable to make the direction of travel unpredictable, and often so irregular that the process becomes inoperative with some molten compositions. Similarly, when the molten piece is to be carried by a transfer surface, contamination can make this operation unreliable.

These problems are particularly serious when the process is operated to generate a very large number of very small pieces at relatively high speed and, in particular, when the process is used for dividing melt into small pieces each of which is then positioned in a container cap in which it is molded to form a gasket in that cap.

Although thermoplastic compositions based on polyethylene, ethylene vinyl acetate copolymers, or similar materials, are often preferred for such gaskets, such compositions can be very sticky when molten. High speed sub-division and transfer of such a melt, especially by the projective mechanism discussed above, can therefore prove difficult or impossible to operate successfully in commercial practice with many of the thermoplastic compositions that would otherwise be preferred. For these reasons it is often necessary to select thermoplastic materials in view of their sub-division and transfer characteristics rather than for their characteristics in the gasket. For instance polyvinyl chloride is often used because it is easier to sub-divide and transfer while in the molten state than materials that might be preferred for other reasons.

The object behind the invention is to find a way of minimising the sticking problems that can occur during the production of small molded articles by the sub-division and transfer of molten thermoplastic materials, especially materials based on polymers such as polyethylene, ethylene vinyl acetate copolymer or thermoplastic rubber.

DESCRIPTION OF THE PREFERRED EMBODIMENTS

A process according to the invention comprises providing a continuous supply of molten thermoplastic composition comprising thermoplastic polymer and continuously cutting the supply into molten pieces and transferring the molten pieces to a molding position by cutting and transfer means, and molding the transferred pieces into the desired molded articles, and in this process the composition includes a melt-release material and there is a melt-release layer on the cutting and transfer means and this layer is continuously replenished by melt-release material from the molten composition.

The invention is of value wherever the composition is sufficiently sticky during the cutting and transferring stages as to incur a substantial risk of contamination of some or all of the cutting and transfer means to such an extent as to interfere with the operation of the process. The invention is of particular value when the thermoplastic composition has a melt viscosity in the range normally required for an extrusion process for the molding of gaskets, for instance a composition having a melt flow index above 3 and often up to 50 g/10 mins (190° C./2.16 Kg). The composition may have a rather low viscosity, e.g., having a melt index above 15 and often above 25, for example 30 to 45.

The invention is primarily intended for high speed processes in which the supply is cut to produce more than 100, usually more than 300 and frequently more than 500 pieces per minute, although for practical operation it is inconvenient for the speed to be too high, and so it is generally not more than 2,000 or 3,000 pieces per minute. Although it is sometimes desired for a molded article to be made from more than one cut piece, generally each molded article is formed from a single cut piece.

The invention is of particular value for the production of molded gaskets for container caps, and especially plastic caps, for example polypropylene caps. In a preferred process a gasket is formed in each of a plurality of caps by providing a continuous supply of molten thermoplastic, gasket-forming, material comprising thermoplastic polymer, continuously cutting the supply into individual molten pieces and transferring one piece into each cap by application to the melt of cutting and transfer surface means, and molding each piece in its associated cap into a gasket, and the molten gasket-forming material includes melt-release material and there is a melt-release layer on the cutting and transferring surface means and this layer is continuously replenished by melt-release material from the melt.

The continuous supply of melt can be on, for instance, a carrier but generally the continuous supply is extruded through the orifice in the orifice face of an orifice head and the continuous cutting occurs substantially at the point of extrusion.

The cutting surface can be, for instance, a blade, wire or other surface that has a leading edge that rotates or reciprocates across the direction of extrusion at a rate, relative to the speed of extrusion, such that each cut piece has the desired volume.

The cutting and transfer means may comprise a single arrangement that simultaneously cuts and transfers the pieces or may comprise two separate arrangements, one for cutting the pieces and another for transferring them. When, as is preferred, the cutting occurs as the melt is extruded through an orifice in an orifice face, the cutting device can rotate at high speed on an axis in front of, or above, and transverse to the orifice so that it wipes across the orifice face, and the orifice face is thus part of the cutting and transfer means on which the melt-release layer is provided.

In one preferred process, the cutting and transfer means comprise the orifice face and a flexible blade that wipes across the face while flexed backwardly, thereby cutting a piece from the melt, and that then snaps forward to project the piece to the molding position. Processes of this type are known as the HC (trade mark) Cap processes and are described in, for example, U.S. Pat. No. 4,277,431 and EP 73334.

In other processes of the invention, the cutting and transfer means comprise a cutter by which the continuous supply of melt is cut into pieces and at least one transfer surface by which the cut pieces are transferred to the moulding position. This transfer surface may comprise a spoon, plunger or other carrier that carries them from the cutting position to the moulding position. Some or all of the transfer may be by application of air pressure or vacuum. Processes of these types include processes such as those known as the SACMI processes and the ZAPATA processes. Such processes are described in, for instance, U.S. Pat. No. 3,705,122, U.S. Pat. No. 4,518,336 and EP 207385.

The melt-release material is incorporated in the thermoplastic composition and is of a material, and in an amount, such that it continuously forms and replenishes a melt-release layer on the cutting and any other surfaces where, prior to the invention, sticking might have been a problem. Thus it can be any compound (or blend of compounds) which reduces or eliminates adhesion of the melt to the surface means. Such compounds include those that are already known as process aids in processes for the manufacture of thin film, for instance to reduce melt fracture or gel streaking of linear low density polyethylene when it is being extruded as a film.

It is of course already known to include slip aids such as fatty amides in gaskets of thermoplastic material but such materials generally are present in only very small amounts and, in particular, are generally such that they migrate to the surface of the gasket only on prolonged storage. Accordingly they are not relevant for increasing slip during a high speed melt process and, in particular, these slip aids often are not suitable for reducing the adhesion of molten thermoplastic material.

The preferred melt-release materials are fluorocarbon polymers and organosilicon polymers, i.e., siloxanes. Particularly preferred are perfluoro hydrocarbons, otherwise known as fluoroelastomers, for instance polytetrafluoroethylene, and siloxane polymers.

Fluorelastomers that may be used, and methods of incorporating them into polymers, are described in, for instance, U.S. Pat. Nos. 3,940,455 and 4,740,341. Suitable silicone compounds, and ways of incorporating them into thermoplastic polymeric compositions, are described in, for instance, U.S. Pat. No. 2,888,419, 3,328,482 and 4,535,113. The silicone compounds described in U.S. Pat. No. 4,535,113 are particularly preferred for use in the invention. Suitable fluoroelastomers are available from DuPont under the trade name VITON-fluoreslastomers and suitable silicone polymers are available from Union Carbide Corporation under the trade name UCARSIL PA, silicone polymers particularly preferred materials being those known as VITON A fluoroelastomers, VITON FREE FLOW 23, fluoroelastomers and UCARSIL PA-1/P55 silicone polymers.

Preferred melt-release materials are solid and extrudable.

The preferred melt-release materials gradually form a melt-release coating during prolonged cutting and transferring, and the formation of such a coating is essential. Some beneficial results can also be obtained with silicone oils, or even hydrocarbon oils, but often such materials do not give optimum properties unless used with some other melt-release aid, for instance the fluoro elastomer or siloxane.

Although the preferred fluoroelastomer and siloxane melt-release aids permit the process to be operated continuously and at high speed, they are not entirely satisfactory for initial start-up since it may take several minutes before an appropriate melt-release layer is formed on the cutting and transferring surface means. This can be tolerable, but if the surface means have a preformed release coating, for instance of polytetrafluoroethylene, satisfactory results may be achieved during start up. Preferably the composition includes a secondary melt-release material that will provide a melt-release layer during initial start up. This secondary melt-release material is preferably silicone oil. A suitable silicone oil is available from Bayer under the trade name BAYSILANE M1000 silicone oil. However hydrocarbon oils such as those known as mineral or white oils can give adequate improvement in some instances. Blends of silicone oil and hydrocarbon oil can be used.

The thermoplastic compositions that are used in the invention for molding into gaskets or other articles are new materials and comprise thermoplastic polymer and a melt-release material which is preferably a fluorocarbon and/or organosiloxane, as described above and which, preferably, includes also a silicone oil or a mineral oil or preferably both. The composition may also contain a slip aid of the conventional type for promoting slip of cap gaskets, for instance a fatty amide.

The amount of primary melt-release material, for prolonged formation and replenishment, generally is in the range 0.05 to 1%, usually 0.1 to 0.5%, most preferably around 0.2%, by weight of the total composition. Secondary melt-release materials, such as silicone oil or mineral oil are generally each added in amounts between 0.1 and 5%, preferably around 0.5 to 2%, by weight of the composition. In all instances, routine optimization will determine the most effective amount.

The remainder of the thermoplastic composition is provided by thermoplastic polymeric material, optionally with minor amounts of additives such as filler, pigments, stabilisers, anti-oxidants or tackifying resins, such additives generally being present in a total amount of below 10%, often below 3%. Slip aid, if present, is generally present in an amount of 0.1 to 5%, often 0.5 to 2%.

Since one of the advantages of the invention is that it is possible to avoid the use of polyvinyl chloride or other chloride containing polymers, the polymeric material is preferably a hydrocarbon or hydrocarbon ester. Suitable polymeric materials are polyethylene, polypropylene, thermoplastic rubbers, ethylene propylene copolymers, acid modified ethylene propylene copolymers, butyl rubber, styrene butadiene rubber, carboxylated styrene butadiene, polyisoprene, styrene isoprene styrene block copolymers, styrene butadiene styrene block copolymers, styrene ethylene butylene styrene block copolymers, polystyrene, ethylene vinyl acetate copolymers, ethylene (meth) acrylate copolymers (for instance ethylene butyl acrylate copolymers) and ethylene vinyl alcohol copolymers. Particularly preferred compositions are those in which the polymer is ethylene vinyl acetate or polyethylene or a thermoplastic rubber or blends thereof. The polyethylene, if used, is preferably a low density polyethylene, and may be a very low density polyethylene. The ethylene vinyl acetate copolymer, if used, preferably is selected to have a melt index such that the overall composition of which it forms a part has a melt index in the preferred range for the intended process. Generally the vinyl acetate content is in the range 1–28%, preferably 9–18%.

The following are examples of the invention.

EXAMPLE 1

A thermoplastic composition having a melt index of about 35, is formed from 100 parts ethylene vinyl acetate polymer containing 28% vinyl acetate, 0.2 parts anti-oxidant, 1 part fatty amide slip aid, 1 part titanium dioxide and 0.01 parts carbon black. The composition also contains 5 parts fluoroelastomer, (VITON FREE FLOW 23 fluoroelastomer) as the primary melt-release aid and a blend of 1 part silicone oil (BAYSILANE M1000 silicone oil) and 1 part mineral oil as the secondary melt-release aid.

EXAMPLE 2

A thermoplastic composition is formed of 90 parts ethylene vinyl acetate polymers containing 14% vinyl acetate, 10 parts of a styrene butadiene styrene thermoplastic rubber, 1 part fatty amide slip aid, 1 part titanium dioxide, 0.2 parts anti-oxidant and 0.01 parts carbon black. It also includes 5 parts siloxane (UCARSIL PA-1/D55 silicone polymers) as primary melt-release aid and 1 part silicone oil (BAYSILANE M1000 silicone oil) and 1 part white oil as secondary melt-release aids.

In each example the composition is blended into a thermoplastic melt in conventional manner and this melt is extruded continuously through a circular orifice in an orifice head. A line of bottle caps is continuously supplied to a position adjacent to the orifice head. A cutting device mounted transversely to the direction of extrusion rotates at high speed and wipes the face of the orifice head and transfers one molten pellet in succession into each cap as it comes into position adjacent the orifice head. The general technique is as described in U.S. Pat. No. 4,277,431. The caps are preferably as described in EP-A-73334.

The molten pellet in each cap is then molded as described in that specification to form an annular gasket around the cap.

When the process is performed only with the primary melt release agent, the accuracy of pellet transfer during the first few minutes after start up is rather erratic or in some cases start up may be impossible. Assuming start up has been possible, accuracy of pellet transfer will improve when the surfaces have been coated with the release layer.

When the process is conducted in the absence of the primary melt release agent but in the presence of silicone oil and/or mineral oil, the result is a satisfactory start up but less than satisfactory long term accuracy of pellet transfer.

When the process is operated without silicone oil, the mineral oil, or the primary melt release agent, the direction of travel of the pellets in the first few minutes after start up is erratic and the apparatus rapidly becomes clogged and inoperable.

This demonstrates the unsuitability of this type of cutting and moulding process to conventional gasket forming compositions based on EVA copolyers, which is why this type of process has primarily been used for compositions based on, for instance, polyvinyl chloride. However in the invention it is now possible to use this type of process with, for instance, compositions based on EVA copolymers.

While this invention has been described with reference to its preferred embodiment, it would be obvious to one skilled in art that other variations and modifications may be made in the invention without departing from its true spirit and scope. It is therefore intended in the appended claims to cover all such equivalent variations and modifications as fall within the true spirit and scope of this invention.

What is claimed is:

1. A process for forming molded thermoplastic articles comprising melting a thermoplastic composition, extruding the molten thermoplastic composition, continuously cutting the molten composition into pieces of a desired length, transferring the cut pieces to a molding position, molding the pieces into a desired configuration and allowing the molded pieces to cool, wherein the thermoplastic composition includes a melt-release material selected from the group consisting of fluorocarbon polymers, organosilicon polymers, and blends thereof, such that the melt-release material forms a coating during the cutting and transferring of the pieces.

2. The process according to claim 1 wherein the composition further comprises a fatty amide slip aid.

3. The process according to claim 1 in which the thermoplastic polymer is selected from the group consisting of ethylene vinyl acetate polymers, polyethylene, and thermoplastic rubbers.

4. A process for forming molded thermoplastic articles comprising melting a thermoplastic composition, extruding the molten thermoplastic composition, continuously cutting the molten composition into pieces of a desired length, transferring the cut pieces to a molding position, molding the pieces into a desired configuration and allowing the molded pieces to cool, wherein the thermoplastic composition includes a melt-release material comprised of a fluoroelastomer, such that the melt-release material forms a coating during the cutting and transferring of the thermoplastic pieces.

5. A process for forming molded thermoplastic articles comprising melting a thermoplastic composition, extruding the molten thermoplastic composition, continuously cutting the molten composition into pieces of a desired length, transferring the cut pieces to a molding position, molding the pieces into a desired configuration and allowing the molded pieces to cool, wherein the thermoplastic composition includes a melt-release material comprised of a siloxane, such that the melt-release material forms a coating during cutting and transferring of the pieces.

6. The process of claim 4 wherein the melt-release material is in an amount of from about 0.05 to about 1% by total weight of the composition.

7. The process of claim 5 wherein the melt-release material is in an amount of from about 0.05 to about 1% by total weight of the composition.

8. The process of claim 4 further comprising a secondary melt-release material selected from the group consisting of silicone oils and hydrocarbon oils, in an amount of from about 0.1 to about 5% by total weight of the composition.

9. The process of claim 5 further comprising a secondary melt-release material selected from the group consisting of silicone oils and hydrocarbon oils, in an amount of from about 0.1 to about 5% by total weight of the composition.

10. A process for forming molded thermoplastic articles comprising melting a thermoplastic composition, extruding the molten thermoplastic composition, continuously cutting the molten composition into pieces of a desired length, transferring the cut pieces to a molding position, molding the pieces into a desired configuration and allowing the molded pieces to cool, wherein the thermoplastic composition includes a primary melt-release material and a secondary melt-release material such that the melt-release materials form a coating during cutting and transferring, the primary melt-release material is selected from the group consisting of fluorocarbon polymers, organosilicon polymers and blends thereof; and the secondary melt-release material is selected from the group consisting of silicone oils, hydrocarbon oils and blends thereof.

11. A process for forming molded thermoplastic articles comprising melting a thermoplastic composition selected from the group consisting of polyethylene, polypropylene, thermoplastic rubbers, ethylene propylene copolymers, acid modified ethylene propylene copolymers, butyl rubber, styrene butadiene rubber, carboxylated styrene butadiene, polyisoprene, styrene isoprene styrene block copolymers, styrene butadiene styrene block copolymers, polystyrene, ethylene vinyl acetate copolymers, ethylene (meth) acrylate copolymers and ethylene vinyl alcohol copolymers extruding the molten thermoplastic composition, continuously cutting the molten composition into pieces of a desired length, transferring the cut pieces to a molding position, molding the pieces into a desired configuration and allowing the molded pieces to cool, wherein the thermoplastic composition includes a melt-release material selected from the group consisting of fluorocarbon polymers, organosilicon polymers, and blends thereof, such that the melt-release material forms a coating during cutting and transferring.

* * * * *